United States Patent
Bennett et al.

(10) Patent No.: US 8,224,750 B1
(45) Date of Patent: *Jul. 17, 2012

(54) METHOD AND SYSTEM FOR UPGRADING LICENSES TO INSTALLED SOFTWARE

(75) Inventors: Jim Bennett, Duvall, WA (US); Peter Oosterhof, Sammamish, WA (US); Aidan Hughes, Bellevue, WA (US); Anzhelika Nishanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1827 days.

This patent is subject to a terminal disclaimer.

(21) Appl. No.: 10/681,067

(22) Filed: Oct. 7, 2003

(51) Int. Cl.
*G06F 21/00* (2006.01)

(52) U.S. Cl. ............. 705/59; 705/51; 705/71; 717/168; 726/27

(58) Field of Classification Search ............. 705/50–79, 705/902, 908; 726/27; 717/168
See application file for complete search history.

(56) References Cited

U.S. PATENT DOCUMENTS

| | | | | |
|---|---|---|---|---|
| 5,892,900 A * | 4/1999 | Ginter et al. | ...... | 726/26 |
| 6,169,976 B1 * | 1/2001 | Colosso | ...... | 705/59 |
| 6,189,146 B1 * | 2/2001 | Misra et al. | ...... | 717/177 |
| 6,434,619 B1 * | 8/2002 | Lim et al. | ...... | 709/229 |
| 6,799,277 B2 * | 9/2004 | Colvin | ...... | 726/22 |
| 6,889,376 B1 * | 5/2005 | Barritz et al. | ...... | 717/175 |
| 6,920,567 B1 * | 7/2005 | Doherty et al. | ...... | 726/22 |
| 6,993,664 B2 * | 1/2006 | Padole et al. | ...... | 705/59 |
| 7,363,318 B1 * | 4/2008 | Dere et al. | ...... | 1/1 |
| 7,734,550 B1 * | 6/2010 | Bennett et al. | ...... | 705/59 |
| 7,742,992 B2 * | 6/2010 | Cronce | ...... | 705/59 |
| 7,921,059 B2 * | 4/2011 | Chicks et al. | ...... | 705/59 |
| 2002/0174356 A1 * | 11/2002 | Padole et al. | ...... | 713/200 |
| 2003/0084306 A1 * | 5/2003 | Abburi et al. | ...... | 713/188 |
| 2004/0093599 A1 * | 5/2004 | Reynaud | ...... | 717/177 |
| 2004/0249756 A1 * | 12/2004 | Garibay et al. | ...... | 705/51 |
| 2005/0066324 A1 * | 3/2005 | Delgado et al. | ...... | 717/170 |
| 2007/0107067 A1 * | 5/2007 | Fountian | ...... | 726/33 |

OTHER PUBLICATIONS

Software Strategies: Software You Can Try Before You Buy/Software Economics Letter.

* cited by examiner

*Primary Examiner* — Calvin L Hewitt, II
*Assistant Examiner* — Steven Kim
(74) *Attorney, Agent, or Firm* — Merchant & Gould P.C.

(57) ABSTRACT

The invention may be considered a method and a system for changing license rights to a software product installed on a computer without reinstalling the software product. A first license and a second license to the software product are stored on the computer along with code for the software product. Subsequent to the installation, a change license module receives a command to change the license to the software product. In response to the command, the configuration data is changed to associate the software product with the second license and limit use of the software product to uses consistent with the second set of rights.

8 Claims, 9 Drawing Sheets

METHOD AND SYSTEM FOR UPGRADING LICENSES TO INSTALLED SOFTWARE

TECHNICAL FIELD

The present invention relates to the distribution, installation and operation of software on a computer and more particularly to a method and apparatus for upgrading a license agreement for an installed software product.

BACKGROUND OF THE INVENTION

Computer software developers typically sell multiple versions of software programs. One typical sales technique is to provide a complete version, but under a trial license that may limit the operation of the software product in some way. One example is providing users with free copies of software that only work for limited period of time as dictated by the terms of the trial license. The trial license may further limit access to other features such as specific capabilities or interoperability features.

Limiting the owner's use of the software product to the terms of the trial license is normally accomplished through the use of configuration data stored on the computer on which the software product is installed. There are typically one or more items of configuration data associated with each software product installed on the computer. Based on the information contained in the configuration data for a software product, the features and behavior of the software product may be limited. When a software product is installed, configuration data for that product is stored that limits the use of the software product to be consistent with the rights conveyed by the license to the software. One example of configuration data is a registry entry stored in a registry maintained by the computer's operating system of software products. Upon installation of a new software product, a registry entry for that product is created containing some or all of the configuration data necessary to execute or instantiate the software product.

Unfortunately, a user wishing to upgrade to the full license to an installed software product must (in addition to purchasing the rights to the full license version) reinstall the entire software product to delete the previous configuration data and license and create new configuration data in accordance with the new license terms.

One drawback of this method is that the user must be able to find the original storage media containing the trial version. In addition, the reinstallation requirement is frustrating to users because of the time, complexity and inconvenience of uninstalling and reinstalling software. Another frustrating drawback is that files, macros, and user preferences created for the trial version by the user can occasionally be lost in the reinstallation process. From the software developer's perspective, the uninstall/reinstall process is also inefficient as normally most, if not all, of the code for the full version of a software product is installed as part of the installation of the trial version. Thus, reinstallation just to change the configuration data for the software product is inefficient.

SUMMARY OF THE INVENTION

In accordance with the present invention, the above and other problems are solved by installing all the code necessary for a full version of a software product when installing a trial version. A means is provided for upgrading the end user license agreement (EULA) from a trial license version to a full license version without reinstalling the software.

The invention may be implemented as a computer process, a computing system or as an article of manufacture such as a computer program product or computer readable media. The computer program product may be a computer storage media readable by a computer system and encoding a computer program of instructions for executing a computer process and including the computer code necessary to install multiple, related by distinct software products that share at least some kernel code portion as described above. The computer program product may also be a propagated signal on a carrier readable by a computing system and encoding a computer program of instructions for executing a computer process.

The invention may be considered a method for changing license rights to a software product installed on a computer without reinstalling the software product. A first license and a second license to the software product are stored on the computer along with code for the software product. The first license conveys a first set of rights to the software product. Likewise, the second license conveys a different set of rights to the software product. The software product is installed in accordance with the first license by creating configuration data that associates the software product with the first license and limits the use of the software product to uses consistent with the first set of rights. Subsequent to the installation, a change license module receives a command to change the license to the software product. In response to the command, the configuration data is changed to associate the software product with the second license and limit use of the software product to uses consistent with the second set of rights.

The invention may also be considered a system for changing licenses to a software product installed on a computer. The system includes an installer module that installs the software product on the computer with use limitations consistent with the terms of a first license and the software product. The software product includes an associating file that has a second license associated with a product key. The software product also includes a license change module that, upon receipt of the product key, changes the use limitations to use limitations consistent with the terms of the second license.

These and various other features as well as advantages, which characterize the present invention, will be apparent from a reading of the following detailed description and a review of the associated drawings.

DETAILED DESCRIPTION OF THE INVENTION

Figure 1:
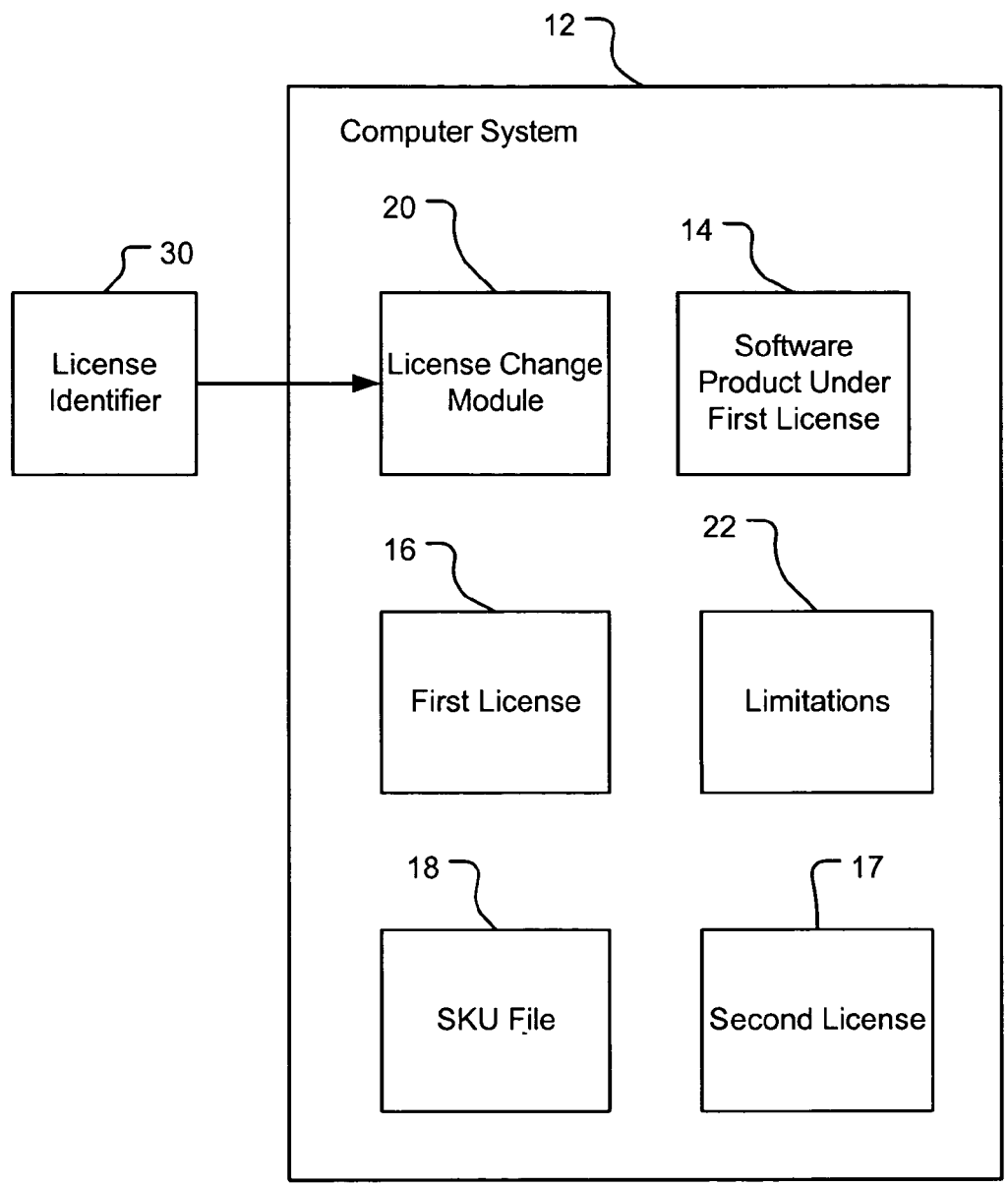
FIG. 1 illustrates the functional elements of a system for changing a license to a software product according to one embodiment of the present invention.

FIG. 1 illustrates the functional elements of a system for changing a license to a software product according to one embodiment of the present invention. In the embodiment shown, installed on a computer system 12 is a software product 14, such as a word processor or spreadsheet application, or virtually any other software application. The software product 14 is installed subject to a set of currently applicable limitations 22. Upon initial installation, the software product 14 was installed in accordance with the terms of a first license 16, known as an End-User License Agreement (EULA), such that the currently applicable limitations 22 are consistent with the terms of the first license 16.

The currently applicable limitations 22 may include enabling or disabling certain features of the software product 14 and otherwise placing limits on the owner's use of the software product 14. Such limitations 22 are stored in the configuration data of the installed software product 14. In one exemplary embodiment wherein the computer maintains a registry (not shown) of installed software, the configuration data is stored in a registry entry for the software product 14 in the registry on the computer. Other methods and systems of storing and maintaining configuration data are known in the art and suitable for use in conjunction with embodiments of the present invention. The use of the software product 14 is limited by the limitations 22 provided in the configuration data. The configuration data for the software product 14 may also include a copy of the currently applicable license 16 to the software product 14.

In addition to the above, the computer system 12 has stored thereon at least one second license 17 to the software product 14. Each license 16 and 17 conveys a different set of use rights on the owner of the software product that correspond to a different set of limitations. For example, the first license 16 may be a trial license that conveys on the owner the right to use the software product for a specified period of time from the first installation. The second license 17, then, may be a full license to the software product with no time limitation.

Also shown on the computer system 12 in FIG. 1 is a license change module 20. In an embodiment of the present invention, the license change module 20 is included as part of the software product 14. In alternative embodiments, the license change module 20 is separate from the software product 14. In any event, the license upgrade module 14 is operable to allow a user to change the limitations 22 that enforce the terms of use of the software product to limitations 22 consistent with the terms of the second license 17.

The license change module 20 may require that the user input a license identifier 30 or some other information that identifies the second license 17. This identifier 30 may also include information that verifies that the license identifier is a valid identifier, thus indicating that the user is entitled to the rights conveyed under the second license 17. One embodiment of a license identifier 30 is a product key that identifies the software product 14, the license 16 or 17 the user is entitled to, and a digital signature for use in validating the license identifier 30.

The license change module 20 can identify the second license 17 in the storage medium 10 that corresponds to the license identified by the license identifier 30. The license change module 20 may do this through the use of a lookup table in a file, such as a SKU file 18, that associates the information provided by valid license identifiers with the second license 17. In addition, the SKU file 18 may include information identifying limitations consistent with the second license 17. In alternative embodiments of the present invention, the second license 17 and the lookup table are contained within the SKU file 18.

At any time subsequent to the initial installation of the software product 14, the user via the license change module 20 may change the license to the software product 14. The user initiates the license change module 20 and provides a license identifier 30. If the license identifier 30 is valid and identifies the second license 17, the limitations 22 for the software product 14 are changed to limitations consistent with the terms of the second license 17. In one embodiment, the license change module 20 replaces the first license 16 in the configuration data with a copy of the second license 17 and changes the controlling data that limits the operation of the software product to only those uses consistent with the rights conveyed by the second license 17.

The embodiment shown in FIG. 1 allows for the efficient changing of a license to a software product without having to uninstall or completely reinstall the software product 14. A trial user may purchase a full license to the software product and upgrade the software product to reflect the new license terms without reinstalling the software product 14.

Figure 2:
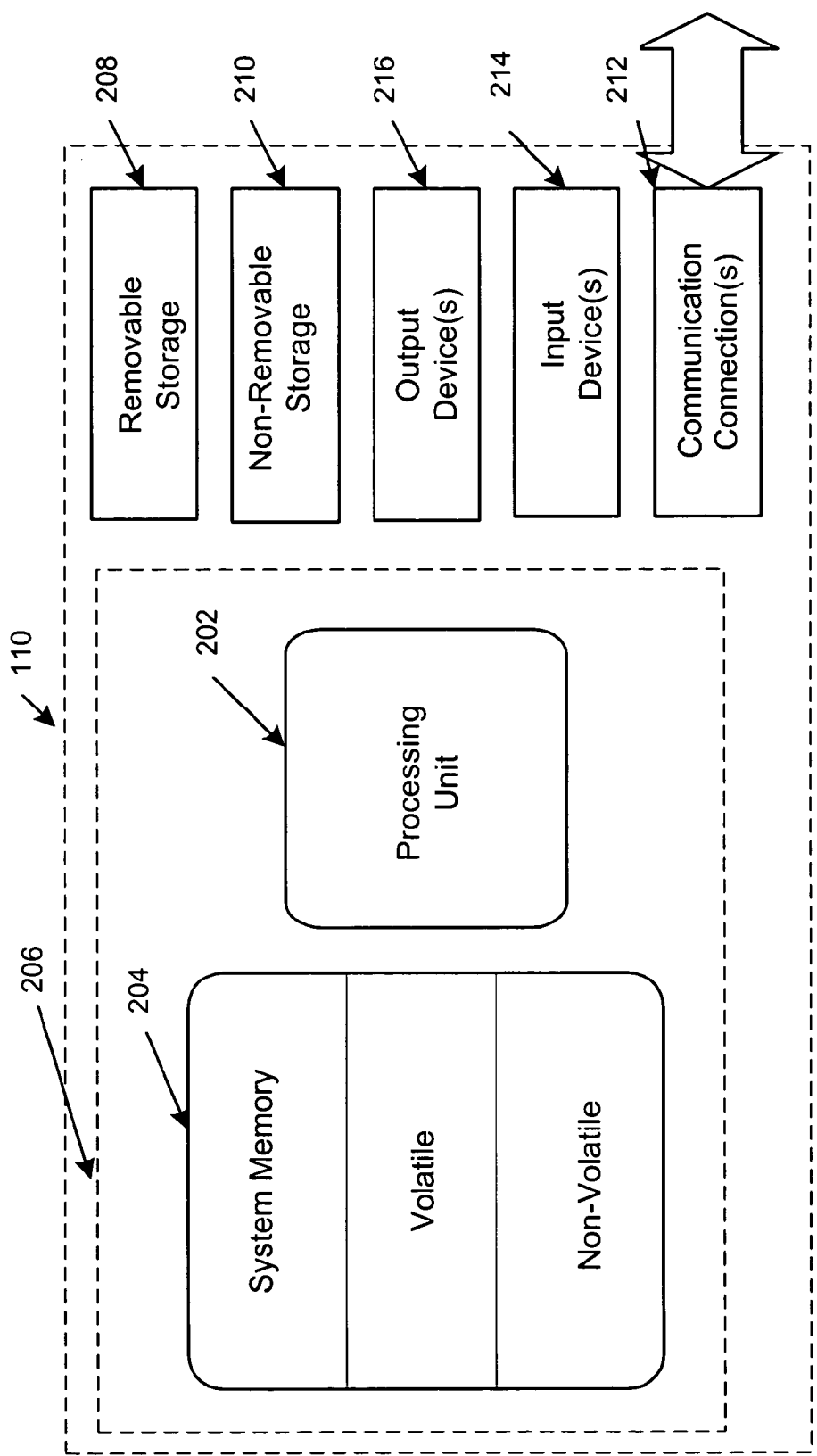
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to function as a server providing a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

License Change Module

A license change module in accordance with embodiments of the present invention is a computer executable program or object that can receive a license identifier 30 such as a product identifier contained in a product key (as discussed in greater detail in FIG. 4), identify the new version (and therefore new license), and install the appropriate computer code from the storage media thereby changing the limitations on the use of the software product to those consistent the new license identified by license identifier 30. In one embodiment, the license change module may be provided as a stand-alone software product separate from any other software product for which it may change licenses. In another embodiment, the license change module may be provided as a utility in operating system software. However, the balance of this disclose will discuss an embodiment in which the license change module is incorporated into a software product and is only capable of changing the license to the software product of which it is a part.

Figure 3:
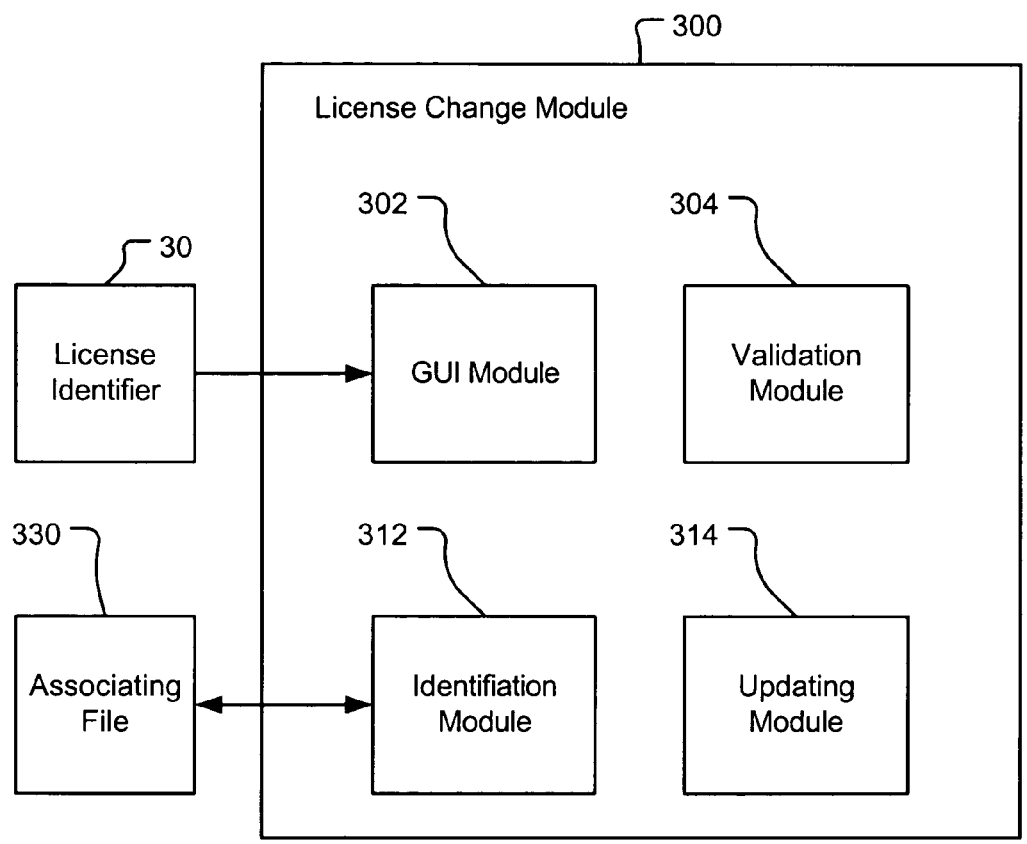
FIG. 3 presents one embodiment of some elements of a license change module in accordance with the present invention.

FIG. 3 presents one embodiment of some elements of a license change module 300 in accordance with the present invention. The license change module 300 includes a graphical user interface (GUI) module 302 that, upon execution of the license change module 300 by the user, presents to the user a GUI. The GUI module 302 may assist the user in obtaining a new license to the software product, for example by directing the user to a website where such a license may be purchased. The GUI module 302 also provides an interface whereby the user may input a license identifier such as a product key and request that the license change module change the license to the software product to a new license.

The license change module 300 also may include a validation module 304. Embodiments of the validation module 304 may include a decryption module (not shown) for decrypting some or all of the product key, a decoding module (not shown) for decoding some or all of the product key as well as information contained in an associating file 330, and a verification module (not shown) for validating the product key.

The license change module 300 includes an identification module 312 based on the information provided in a valid product key identifies the new license and new limitations consistent with the terms of the new license.

The license change module 300 also includes an updating module 314 that performs the necessary actions to change the limitations of the software product to those consistent with the new license. This may involve copying information from an associating file 330 such as the SKU file 18 to configuration data, such as a registry entry, for the software product. It may also involve replacing an old license in the configuration data with a the new license obtained from the SKU file 18.

Product Key

Figure 4:
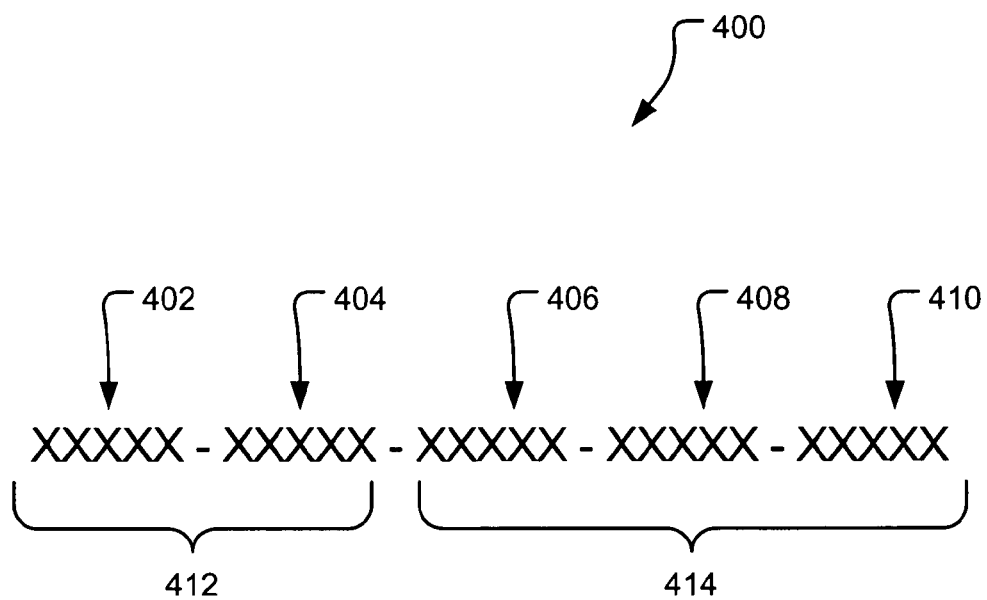
FIG. 4 illustrates one embodiment of a product key in accordance with the present invention.

FIG. 4 illustrates one embodiment of a product key 400 in accordance with the present invention. The product key 400 identifies a software product and the license to which the user is entitled. Product keys may be used as part of an initial installation process and, as in embodiments of the present invention, may be used subsequent to the initial installation to change licenses to the software product.

The product key 400 is in the form of five sets 402, 404, 406, 408 and 410 of five alphanumeric characters, each set separated by a hyphen. The product includes two elements: a product identifier 412, sometimes referred to as the payload; and a digital signature 414.

The digital signature 414 is provided to verify that the product is a valid product key and has been issued from the software developer. Preferably, installers and license change modules will verify the signature with additional information provided either with the installer or license change module, or as part of the software provided with the software product, such as the SKU file.

The product identifier 412 represents the data that the product key 400 provides to the installer in order for the installer to understand which software product version should be installed. Based on the product version to be installed, Embodiments of the product identifier 412 may include various information as necessary to identify the product and a license. In one embodiment, the product identifier 412 includes a Group ID that identifies the software product or product family and a Channel ID that identifies a specific version of the software product. In this embodiment, each specific version is licensed under a specific license to the product. Therefore, by identifying the version, the applicable license is also identified. For example, Group ID of 5 may be a word processor product, and a Channel ID of 777 that may identify a retail, home version of the product having a home-user license. In addition, product identifiers may also contain a serial number.

Association of the Product Key with a Specific License

One skilled in the art will immediately recognize that there are many ways of associating a product identifier with specific contents of storage media, such as a set of limitations and a specific license. The discussion below presents one embodiment of a single computer-readable associating file, such as the SKU file 18, that is provided to associate a product identifier, such as one 412 provided in a product key 400 as described above, with the appropriate second license 17. In addition, the associating file may also dictate or identify the installation and runtime behaviors consistent with each license that should be enabled or disabled in accordance with the terms of the licenses. The discussion should not be considered to limit the scope of the invention to that particular embodiment as many other embodiments that associate a product identifier with a license and its limitations are possible.

Figure 5:
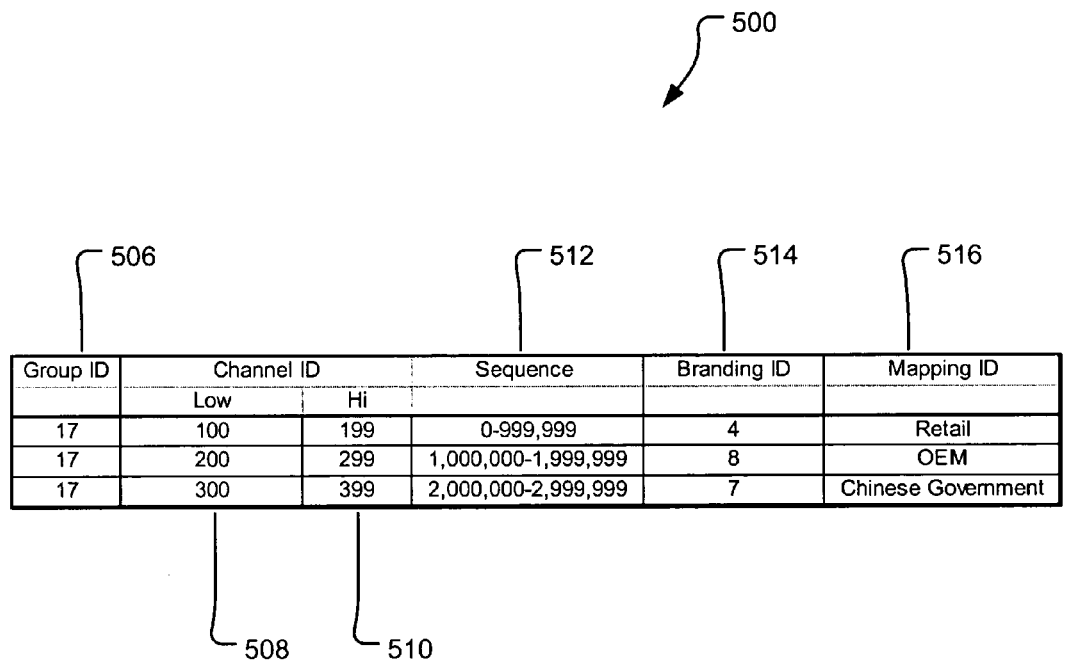
FIG. 5 presents one embodiment of a SKU table that associates product identifiers with a specific software product and version of the product.

FIG. 5 presents one embodiment of a table 500 contained in an association file, such as a SKU file 18, that associates product identifiers 412 in the embodiment described above with a specific product and version, each version having at least a version-specific license to the product. In order to determine the product, version and license from the product identifier, one embodiment of the present invention provides the association file with each software product.

The table 500 shown in FIG. 5 is referred to as the SKU table 500. The SKU table 500 associates product identifiers with a specific product and version (and therefore license). In the embodiment shown, a column of Group IDs 506 is provided wherein each Group ID indicates a specific product.

Channel IDs are contained in the lookup table 500 as two columns that identify a range: a column 508 containing the low end of the range and a column 510 for the high end of the range. Next is a column 512 that contains the sequence number of serial numbers that are valid for the range indicated by the Channel ID columns 508, 510.

Yet another column 514, referred to as the branding column 514, contains a brand ID that identifies information specific to how the version of the product is to be presented to the user. This will be discussed in greater detail with respect to the branding table in FIG. 6.

The last column 516 shown is an indicator of whether the product is a retail or OEM product. This column is referred to as the mapping column 516 and it contains mapping identifiers specific to each product version. In some embodiments, information in the mapping column can be used with the Mapping Table shown in FIG. 8 to identify the proper license, i.e., EULA, to the product. In other embodiments, the mapping column 516 is not necessary.

The mapping identifiers, in addition to possibly being used to identify the EULAs as discussed below, also may dictate specific functions of the software installed on the computer that required under the terms of the EULA. For example, trial products might not request or prompt the user for a product key when installed. Rather, the trial product may only prompt the user to accept the terms of the trial license during installation. Alternatively, the product installation might be the same for the trial and full versions of the software product, but the trial product may be provided with a product key identifying a trial version of the software. Additional embodiments of a table 500 or similar structures for associating a product identifier with a version or a set of behaviors that constitute a distinct version will be immediately suggested to one skilled in the art. The embodiment provided in FIG. 5 is provided as an example only and should not be considered as limiting the scope of the present invention.

Figure 6:
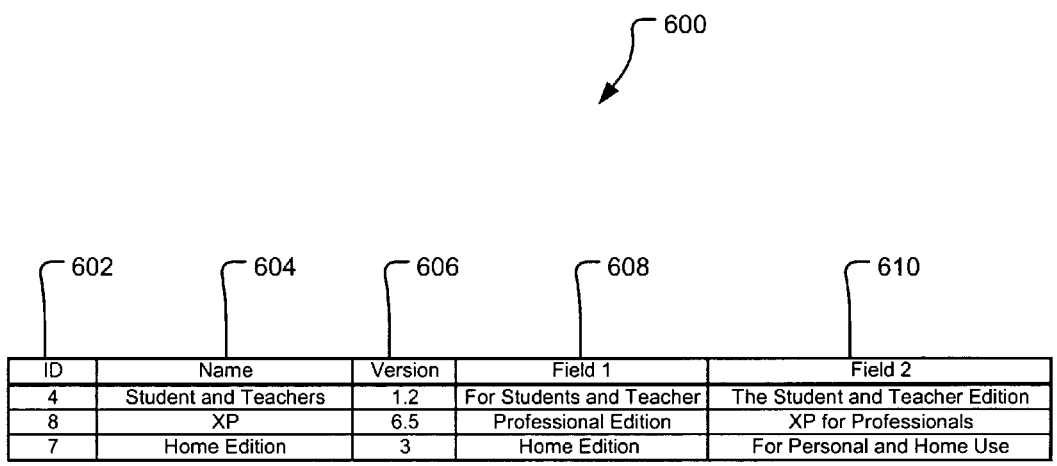
FIG. 6 presents an embodiment of a Branding Table in accordance an embodiment of with the present invention.

FIG. 6 presents an embodiment of a Branding Table 600. The branding table includes information concerning what text and GUIs should be displayed during execution of the product and installation. For example, a trial version of a word processor may identify in the branding table that the phrase "Trial Version" should appear in the title bar of the product when in use, or when initially executed or in the product specific information pages, such as those found via the "Help/About" pulldown menu in some products.

In the embodiment of the Branding Table 600 shown in FIG. 6, unencoded text is provided for use in GUIs shown to the user during installation or runtime. A first ID column 602 is provided that includes a branding ID for each branded version. A name column 604 is provided that includes an unencoded name for the brand identified by the branding ID. A version column 606 is provided that identifies the version of the branding. In the embodiment shown in FIG. 6, the table 600 also includes two field columns 608 and 610 that include unencoded text for use in different fields contained in the GUIs and screens that are presented to the user either during installation or runtime. Additional embodiments of a Branding Table 600 or similar structures for including and providing the branding information will be immediately suggested to one skilled in the art. The embodiment provided in FIG. 6 is provided as an example only and should not be considered as limiting the scope of the present invention.

Figure 7:
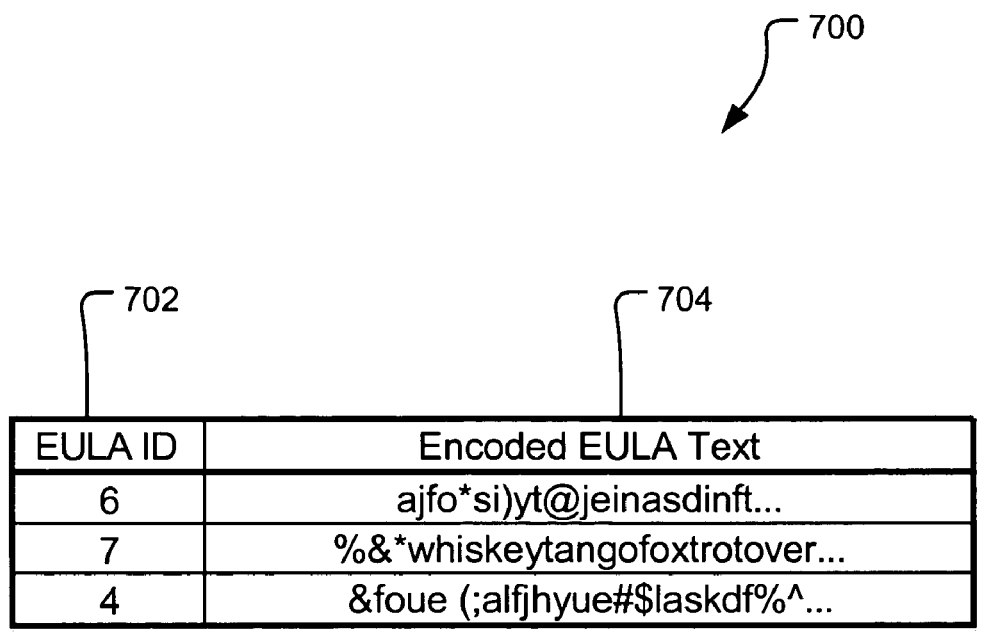
FIG. 7 presents an embodiment of a EULA Table in accordance with an embodiment of the present invention.

FIG. 7 presents an embodiment of another table contained in an associating file, such as a SKU file 18, for storing the licenses. In the embodiment shown in FIG. 5, each version is associated with a specific license known as an End-User License Agreement (EULA). Each version of a software product is sold under a version-specific EULA. This may be true even if the only difference between two versions is the EULA. Embodiments of the SKU file 18 may contain a table 700 that contains the EULAs for and associates each EULA with the various versions that may be installed. The EULA Table 700 is a simple two-column table having a EULA identifier in one column 702 and containing a base 64 encoded EULAs in the other column 704. The installer and license change module obtain the appropriate EULA identifier by consulting one or more of the other tables 500, 600 and 800 in the file. Then using the EULA Table 700, extracts and decodes the appropriate EULA for storage on the computer during installation. Additional embodiments of a EULA table 700 or similar structures for identifying and providing EULAs specific to various versions of software products will be immediately suggested to one skilled in the art. The embodiment provided in FIG. 7 is provided as an example only and should not be considered as limiting the scope of the present invention.

Figure 8:
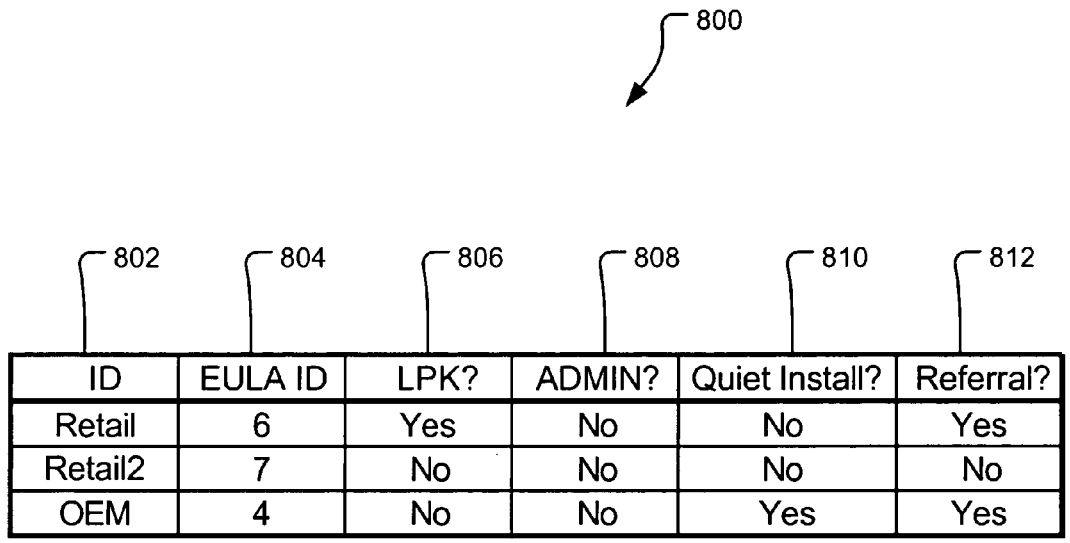
FIG. 8 presents an embodiment of a Mapping Table in accordance with an embodiment of the present invention.

FIG. 8 presents another table 800, a Mapping Table 800, that may be found in an associating file such as the SKU file 18. In the embodiment shown, the Mapping Table 800 identifies certain behaviors of the various versions of the software products listed on the table 800 and, presumably, stored on the storage media. The Mapping Table 800 includes one column 802 for the mapping identifier and a second column 804 for the EULA ID associated with each mapping identifier. In addition, the Mapping Table 800 includes additional columns that identify other behaviors. A "LPK?" column 806 is provided that identifies whether an extended set of languages, known as a language pack, should be installed with each version of the software product. An "ADMIN?" column 808 is includes that identifies whether the administrator is the only user to have rights to change the configuration of the software product after installation. A "Quiet Install?" column 810 identifies whether any screens are presented to the installing consumer during installation, such as the product key input screen. A "Referral?" column 812 is also provided.

An alternative embodiment of the Mapping Table 800 may be another simple two-column table that associates the identifiers found in the mapping column 516 of the SKU table 500 with a EULA ID. The mapping table includes one column 802 for the mapping identifier and a second column 804 for the EULA ID associated with each mapping identifier. Additional embodiments of a Mapping Table 800 or similar structures for identifying the behaviors included in a version will be immediately suggested to one skilled in the art. The embodiment provided in FIG. 8 is provided as an example only and should not be considered as limiting the scope of the present invention.

In embodiments of the present invention the SKU file 18 is copied in its entirety onto the computer as part of the installation process. In other embodiments, it is consulted and only selected portions of the contents of the file (such as the potentially applicable EULAs, associated limitation information, any branding information, etc.) are copied onto the computer during installation. One skilled in the art will recognize that many different ways of providing a file that associates the product identifier with specific branding, mapping, and EULA behaviors are possible and that the above is but one example. In addition, one skilled in the art will recognize that, in addition to providing an associating file such as the SKU file 18 described above, there are many analogous and functionally equivalent ways to perform and support the same functions performed and supported by the SKU file.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 9:
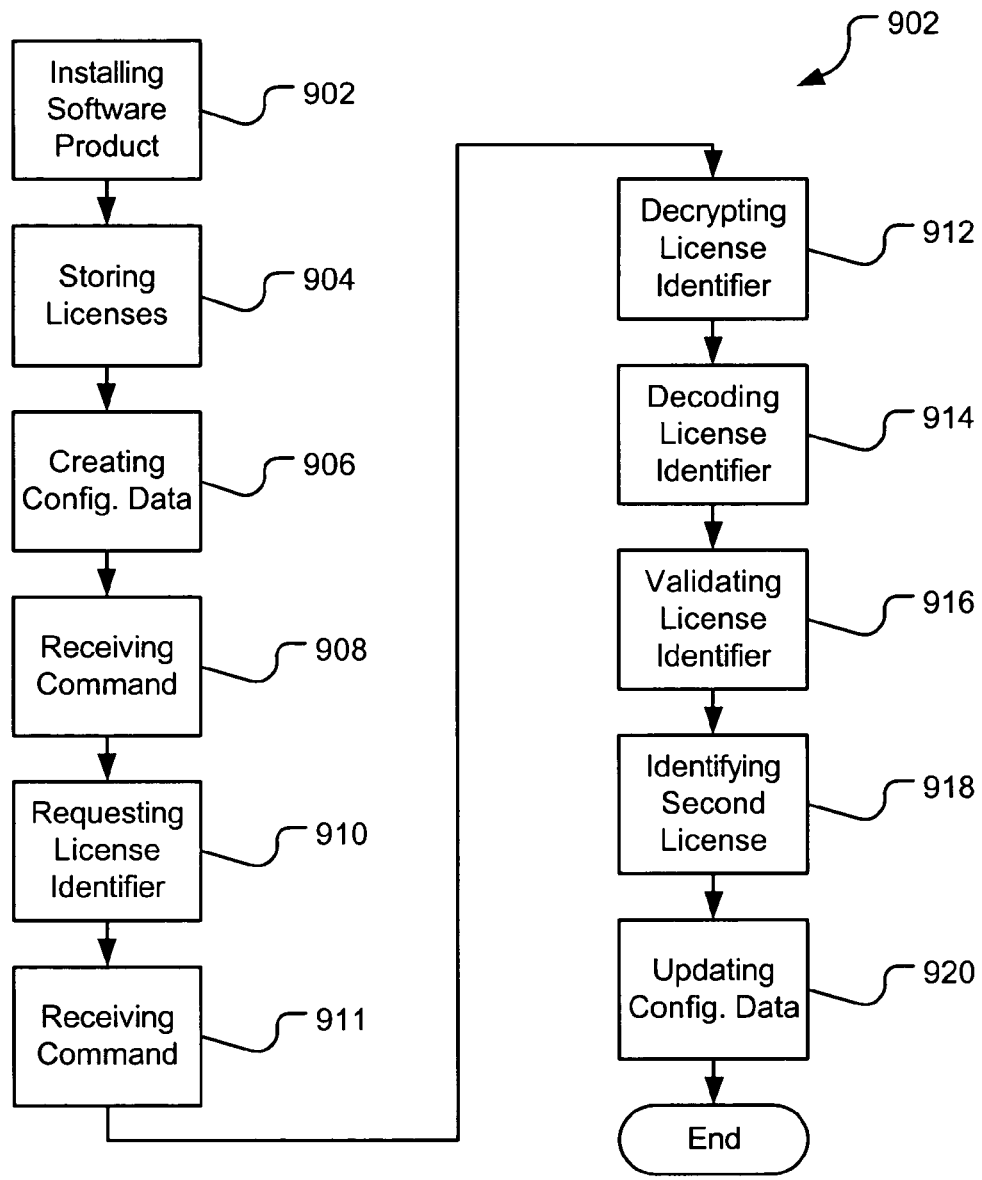
FIG. 9 presents an embodiment of logical operations for changing the license of an installed software product in accordance with an embodiment of the present invention.

FIG. 9 presents an embodiment 900 of logical operations for changing the license of an installed software product in accordance with the present invention. An installation operation 902 initially installs a software product on a computer system. The software product installed is associated with a first license to which the user is entitled. The first license may be included on the storage medium the software product is installed from.

In one embodiment, the installation operation 902 includes requesting and receiving a license identifier such as a product key that identifies the first license. In that case, the installation operation 902 may require the use of an associating file such as the SKU file 18 to identify the first license using information contained in the license identifier.

A storing operation 904, possible as part of the overall installation, stores one or more second licenses on the computer system. The second license(s) conveys a different set of rights to the software product. The second licenses may be included with the first license on the storage medium the software product is installed from. Furthermore, the second license(s) may be included in an associating file such as the SKU file 18 which is stored along with code related to the software product.

Storing operation 904 may also store information related to the limitations consistent with each second license. For example, the SKU file may contain a copy of each of the second licenses in a EULA table and also contain listings of behavior, branding and mapping information that is specific to each second license.

As part of the overall installation, a configuration data operation 906 creates configuration data, such as a registry entry, for the software product. The configuration data include limitations on the use and operation of the software product that are consistent with the first license. In addition, a copy of the first license may also be stored in the configuration data as part of the configuration data operation 906.

Subsequent to the initial installation, a receiving operation 908 receives a command from a user of the computer system to change the license to the software product. Receiving this command may involve receiving commands through a GUI provided by a license change module in the software product.

Alternatively, the receiving operation 908 may involve the user responding to a notification from the software program that the user has requested an operation or attempt to use the software product in a manner that violates a term of the first license. The notification may include directions to the user on how to obtain the second license to the software product.

In response to the command received in the receiving operation 908, a requesting operation 910 requests that the user supply a license identifier that identifies a second license to the software product. In response to this request, a license identifier is received in a second receiving operation 911. The license identifier received identifies a second license and may provide verification information, such as a digital signature, verifying the authenticity of the user.

The receiving license identifier, for example an encoded and encrypted product key 400, is then validated. This may include a decrypting operation 912 that decrypts some or all of the license identifier and a decoding operation 914 that decodes some or all of the information in the license identifier.

A validation operation 916 validates the license identifier. This may involve inspecting the contents of the license identifier or accessing an external database of licensee information or both. If the license identifier is not valid, an error notification may be provided to the user and the software product remains as it was, with limitations in accordance with the first license.

If the license identifier is validated in the validation operation 916, an identification operation 918 identifies the second license using information from the license identifier. This may involve accessing the SKU file that was stored on the computer as part of storing operation 904. In addition to identifying the second license, information relating to limitations consistent with the second license is also identified.

Once the second license and its limitations are identified, an updating operation 920 changes the configuration data for the software product. The changing may include replacing the limitations consistent with the first license with the limitations of the second license. The changing may also include replacing the first license with a copy of the second license. Alternatively, the updating operation 920 may involve completely replacing the configuration data with a second configuration data for the software product. Upon completion of the updating operation, the software product is installed on the computer system in accordance with the terms of the second license.

The updating operation 920 may include copying or using information provided in the SKU file related to the second license and the limitations consistent with the terms of the second license. For example, an encoded second license in the SKU file may be decoded and copied to the configuration data. In an alternative embodiment, a pointer in the configuration data may be changed to point to a copy of the second license.

Although the invention has been described in language specific to computer structural features, methodological acts and by computer readable media, it is to be understood that the invention defined in the appended claims is not necessarily limited to the specific structures, acts or media described. As an example, rather than storing the associating file on the computer, it may reside on the storage media that the software product came with, requiring access to the storage media during the license change. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A computer-implemented method for upgrading a license for an installed software product from a first license to a second license, the method comprising:

storing, on the computer, a software product, the first license, the second license, and an associating file, the first license is a trial license and the second license is a full version license, wherein the associating file comprises for each license, a Channel ID, and information identifying limitations;

receiving, by the computer, a first product key from a user;

identifying, by the computer, the first license from the associating file using a portion of the first product key and the Channel ID for the first license;

generating, by the computer, configuration data and including, by the computer, the first license and limitations of the first license in the configuration data;

receiving, by the computer, a notification of a violation of terms of the first license;

in response to receiving the notification, requesting, by the computer, a second product key from the user;

receiving, by the computer, a second product key from the user;

identifying, by the computer, the second license from the associating file using a portion of the second product key and the Channel ID for the second license; and replacing, by the computer, in the configuration data the first license and the limitations of the first license with a copy the second license and limitations of the second license, respectively.

2. The computer-implemented method of claim 1, wherein the first product key and the second product key includes a product identifier comprising Group ID.

3. The computer-implemented method of claim 1, wherein the associating file contains an encoded version of the first license and the second license.

4. The computer-implemented method of claim 3, wherein the associating file is a SKU file containing SKU table, a mapping table, a branding table, and a EULA table.

5. A computer readable storage memory comprising instructions for upgrading a license for an installed software product from a first license to a second license, the instructions, when executed by a processing device on the computer, cause the computer to perform steps comprising:

storing, on the computer, a software product, the first license, the second license, and an associating file, the first license is a trial license and the second license is a full version license, wherein the associating file comprises for each license, a Channel ID, and information identifying limitations;

receiving, by the computer, a first product key from a user;

identifying, by the computer, the first license from the associating file using a portion of the first product key and the Channel ID for the first license;

generating, by the computer, configuration data and including, by the computer, the first license and limitations of the first license in the configuration data;

receiving, by the computer, a notification of a violation of terms of the first license;

in response to receiving the notification, requesting, by the computer, a second product key from the user;

receiving, by the computer, a second product key from the user;

identifying, by the computer, the second license from the associating file using a portion of the second product key and the Channel ID for the second license; and replacing, by the computer, in the configuration data the first license and the limitations of the first license with a copy the second license and limitations of the second license, respectively.

6. The computer readable storage memory of claim 5, wherein the first product key and the second product key includes a product identifier comprising Group ID.

7. The computer readable storage memory of claim 5, wherein the associating file contains an encoded version of the first license and the second license.

8. The computer readable storage memory of claim 7, wherein the associating file is a SKU file containing SKU table, a mapping table, a branding table, and a EULA table.

* * * * *